United States Patent
Seo et al.

(10) Patent No.: US 10,254,899 B2
(45) Date of Patent: Apr. 9, 2019

(54) OPTICAL APPARATUS INCLUDING NON-ELECTRIC TYPE TOUCH PANEL

(71) Applicant: SAMSUNG ELECTRONICS CO., LTD., Suwon-si (KR)

(72) Inventors: Won-taek Seo, Yongin-si (KR); Seung-hoon Han, Seoul (KR); Hong-seok Lee, Seongnam-si (KR); Wan-joo Maeng, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/634,495

(22) Filed: Jun. 27, 2017

(65) Prior Publication Data
US 2017/0300175 A1 Oct. 19, 2017

Related U.S. Application Data (62) Division of application No. 14/019,922, filed on Sep. 6, 2013, now Pat. No. 9,720,547.

(30) Foreign Application Priority Data

Mar. 19, 2013 (KR) .................. 10-2013-0029244

(51) Int. Cl.
*G03B 21/16* (2006.01)
*G06F 3/042* (2006.01)

(52) U.S. Cl.
CPC .. *G06F 3/0421* (2013.01); *G06F 2203/04109* (2013.01)

(58) Field of Classification Search
CPC .................. G06F 3/0421; G06F 2203/04109
USPC ............................................... 353/33
See application file for complete search history.

(56) References Cited

U.S. PATENT DOCUMENTS

| | | | |
|---|---|---|---|
| 4,776,661 A | 10/1988 | Handa | |
| 5,738,429 A * | 4/1998 | Tagawa | G03B 21/132 353/122 |
| 8,259,240 B2 | 9/2012 | Han | |
| 2007/0152985 A1 | 7/2007 | Ostergaard et al. | |
| 2008/0052626 A1 | 2/2008 | Han | |
| 2010/0302185 A1* | 12/2010 | Han | G06F 3/042 345/173 |
| 2010/0302196 A1* | 12/2010 | Han | G06F 3/0425 345/173 |
| 2011/0050650 A1 | 3/2011 | McGibney et al. | |

FOREIGN PATENT DOCUMENTS

| | | |
|---|---|---|
| JP | 2012-194424 A | 10/2012 |
| KR | 10-1092060 B1 | 12/2011 |

\* cited by examiner

*Primary Examiner* — Steven H Whitesell Gordon
*Assistant Examiner* — Jerry Brooks
(74) *Attorney, Agent, or Firm* — Sughrue Mion, PLLC (57) ABSTRACT

An optical apparatus includes a touch substrate; a waveguide layer arranged on the touch substrate, the waveguide layer including a plurality of waveguides; an optical output structure arranged on the waveguide layer and configured to output light propagating in the plurality of waveguides at touched locations on the touch substrate; a gap layer arranged to provide a predetermined gap between the waveguide layer and the optical output structure; and an optical system, which projects light output by the optical output structure.

4 Claims, 8 Drawing Sheets

OPTICAL APPARATUS INCLUDING NON-ELECTRIC TYPE TOUCH PANEL

CROSS-REFERENCE TO RELATED APPLICATIONS

This application is a Divisional of U.S. patent application Ser. No. 14/019,922, filed Sep. 6, 2013, which claims priority from Korean Patent Application No. 10-2013-0029244, filed on Mar. 19, 2013 in the Korean Intellectual Property Office, the disclosures of which are incorporated herein in their entireties by reference.

BACKGROUND

1. Field

Apparatuses consistent with exemplary embodiments relate to optical apparatuses including non-electric type touch panels, and more particularly, to optical apparatuses including non-electric type touch panels configured to simultaneously project light beams to a plurality of locations or project light beams having arbitrary shapes.

2. Description of the Related Art

Beam projectors for projecting images on screens are used in various fields for presentations and education. In addition, laser pointers are generally used for illuminating particular points on images projected by beam projectors. However, since a general laser pointer is capable of illuminating/mapping only a single point at a time, it is impossible to illuminate a plurality of points or project a light beam having an arbitrary or user-desired shape.

SUMMARY

According to an aspect of exemplary embodiment, an optical apparatus includes a touch substrate; a waveguide layer, which is arranged on the touch substrate, the waveguide layer including a plurality of waveguides; an optical output structure, which is arranged on the waveguide layer and is configured to output light propagating in the plurality of waveguides at touched locations on the touch substrate; a gap layer, which is arranged to provide a predetermined gap between the waveguide layer and the optical output structure; and an optical system, which projects light output by the optical output structure to the outside.

The optical apparatus further includes optical input portions, wherein each of the optical input portions is connected to one of the plurality of waveguides.

The touch substrate and the waveguide layer may be elastically deformable by external pressure.

The gap layer may be formed of a flexible and stretchable dielectric film, a gas, or a liquid and the refractive index of the gap layer may be less than the refractive index of the waveguides and the refractive index of the optical output structure.

The waveguide layer may include a plurality of waveguides having the same length and a thickness of the gap layer gradually decreases from optical input ends of the waveguides to opposite ends of the waveguides.

The waveguide layer may include a plurality of waveguides having the same length and the hardness of the gap layer may gradually decrease from optical input ends of the waveguides to opposite ends of the waveguides.

The waveguide layer may include a plurality of first waveguides, which are parallel to one another and have different lengths, and a plurality of second waveguides, each of the second waveguides connected to an output end of one of the first waveguides, the first waveguides may include a hard material, and the second waveguides may include an elastically deformable material.

The waveguide layer may include a plurality of pixel lines, each of the plurality of pixel lines including the plurality of first and second waveguides.

A plurality of micro-prisms may be repeatedly arranged in the optical output structure.

A light exit surface of each of the micro-prisms may be a flat surface.

A light exit surface of each of the micro-prisms may be a curved surface, and the shape of the light exit surface of each of the micro-prisms may be a circular arc of which the origin is the center of a bottom surface of the corresponding micro-prism via which light is incident.

A plurality of reversed trapezoidal micro-prisms may be repeatedly arranged in the optical output structure.

The optical system may be arranged to face the optical output structure and includes an optical lens having positive refraction power.

The optical apparatus may further include a transparent fixing member arranged on the gap layer to fix the trapezoidal micro-prisms, and a light exit surface of the transparent fixing member may be parallel to light exit surfaces of the reversed trapezoidal micro-prisms.

The optical output structure may include a single prism arranged on the gap layer.

The optical system may include a concave mirror for magnifying and reflecting light output by the optical output structure.

The optical system includes a flat mirror for reflecting light output by the optical output structure and an optical lens having a positive refraction power for focusing the light reflected by the flat mirror.

The optical apparatus may further include a transparent fixing member arranged on the gap layer to fix the optical output structure, and a light exit surface of the transparent fixing member is inclined, such that light output by the optical output structure is perpendicularly incident to the light exit surface of the transparent fixing member.

The optical apparatus may further include a pressing element array configured to press the touch substrate in a predetermined pattern to project light in.

The pressing element array may include a plurality of piezoelectric pressing elements that are 2-dimensionally arranged.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the embodiments are merely described below, by referring to the figures, to explain aspects of the present description.

Figure 1:
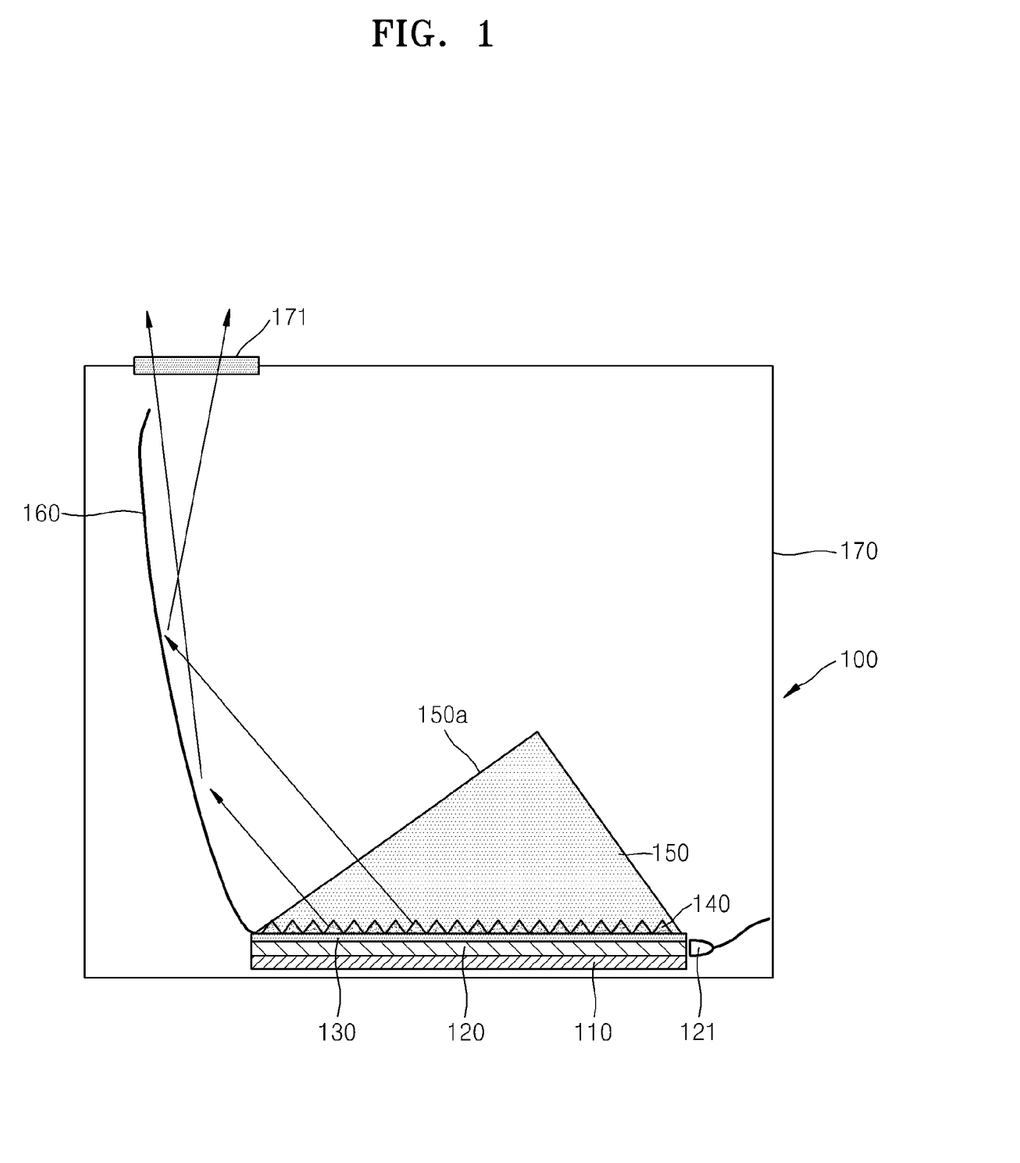
FIG. 1 is a schematic view of an optical apparatus including a non-electric type touch panel, according to an exemplary embodiment.

FIG. 1 is a schematic view of an optical apparatus 100 including a non-electric type touch panel, according to an exemplary embodiment.

Referring to FIG. 1, the optical apparatus 100 according to an exemplary embodiment may include a touch substrate 110, a waveguide layer 120, a transparent optical output structure 140, a gap layer 130, and a concave mirror 160, wherein the waveguide layer 120 is arranged on the touch substrate 110 and includes a plurality of parallel waveguides, the transparent optical output structure 140 is arranged on the waveguide layer 120 and is configured to output light propagating along the plurality of waveguides at touched locations of the touch substrate 110, the gap layer 130 is configured to provide a predetermined gap between the waveguide layer 120 and the optical output structure 140, and the concave mirror 160 is part of an optical system which projects light output by the optical output structure 140 to the outside. Furthermore, the optical apparatus 100 may further include an optical input 121, which inputs light into each of the plurality of waveguides. The optical apparatus 100 may further include a housing 170 surrounding the components stated above. A transparent window 171 may be arranged at a location facing the concave mirror 160, such that light may be transmitted to the outside of the housing 170 through the transparent window 171.

Figure 2:
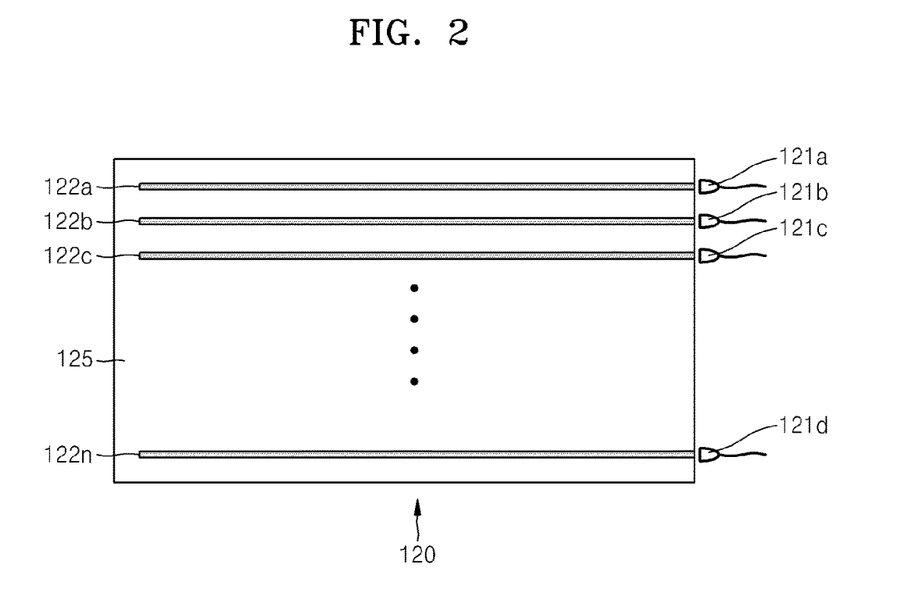
FIG. 2 is a schematic plan view of an example configuration of a waveguide layer of the non-electric type touch panel, according to an exemplary embodiment.

The touch substrate 110 is a unit contacted by an external pressing object (e.g., a finger or a pen) and may be formed of a material that may be elastically deformed by external pressure. Furthermore, the waveguide layer 120 may also be formed of a material that may be elastically deformed by external pressure. For example, referring to FIG. 2, the waveguide layer 120 may include a pressure deformable polymer film 125 and a plurality of parallel waveguides 122a through 122n arranged on the polymer film 125. As shown in FIG. 2, the plurality of waveguides 122a through 122n may have a same length, and optical input portions 121a through 121n may be respectively connected to inputs of the waveguides 122a through 122n and provide light respectively to the waveguides 122a through 122n. Therefore, light may simultaneously propagate in a single direction via the plurality of waveguides 122a through 122n. The waveguides 122a through 122n may be formed of optic fibers, for example.

The gap layer 130 is also formed of a material that may be elastically deformed by external pressure. For example, the gap layer 130 may be formed of a flexible and stretchable dielectric film, a gas, or a liquid. The touch substrate 110 and the waveguide layer 120 may have an appropriate hardness, such that the touch substrate 110 and the waveguide layer 120 may be bent by external pressure without significant changes in the thicknesses thereof. In contrast, the gap layer 130 may be formed of a soft material of which a thickness may be significantly changed by external pressure.

According to the embodiment shown in FIG. 1, the optical output structure 140 may be a micro-prism array in which a plurality of micro-prisms are repeatedly arranged. For example, as shown in FIG. 1, a plurality of micro-prisms, each having the shape of a right-angled isosceles triangle and each having the same size may be arranged at a constant interval on the gap layer 130. Here, pyramid-like micro-prisms may be 2-dimensionally arranged in a matrix format, or 2-dimensional micro-prisms may be 1-dimensionally arranged in a row. The optical output structure 140 may be directly adhered onto the gap layer 130 and fixed thereto, or may be fixed on the gap layer 130 via a transparent supporting member 150 formed to cover the optical output structure 140. If the supporting member 150 is employed, light output by the micro-prisms of the optical output structure 140 may pass through the supporting member 150 and be incident on the concave mirror 160. To reduce the variations and complexity of light propagating paths, a light exit surface 150a of the supporting member 150 may be inclined at a predetermined angle, such that light output by the optical output structure 140 is perpendicularly incident on the light exit surface 150a of the supporting member 150, where "perpendicularly incident" refers to light which is incident at an angle normal to the exit surface 150a of the supporting member 150.

Figure 3:
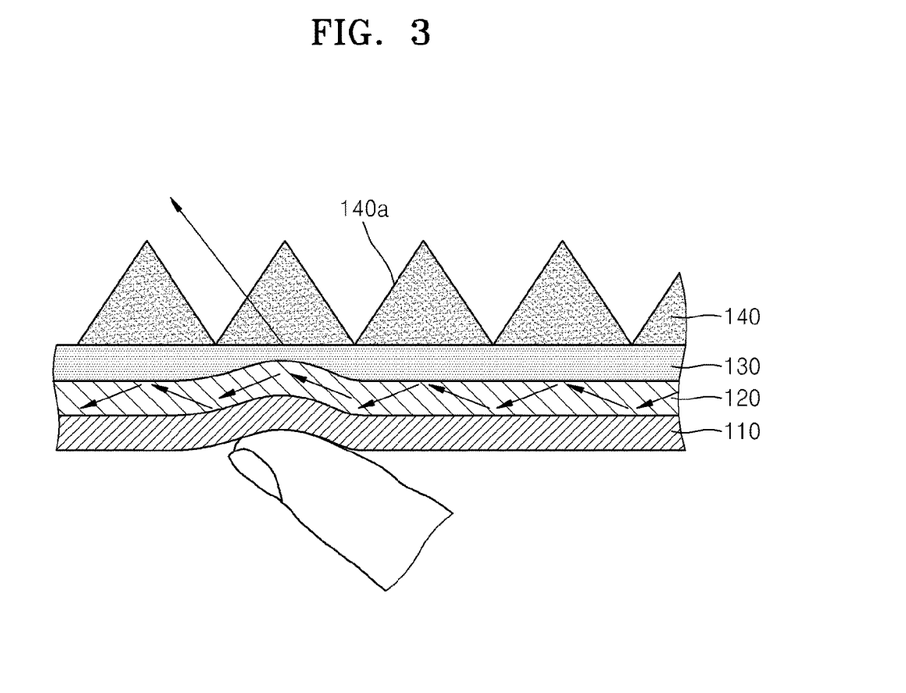
FIG. 3 is a diagram schematically showing an operating principle of the non-electric type touch panel of the optical apparatus having the structure shown in FIG. 1.

FIG. 3 is a diagram schematically showing an operating principle of the non-electric type touch panel of the optical apparatus 100 having the structure shown in FIG. 1. Referring to FIG. 3, light may propagate in a single direction via total reflection inside the waveguides 122a through 122n in the waveguide layer 120. To this end, the refraction index of the gap layer 130 and the refraction index of the touch substrate 110 may be less than the refraction index of the waveguide layer 120, and more particularly, may be less than the refraction indexes of the plurality of waveguides 122a through 122n arranged in the waveguide layer 120. For example, the refraction indexes of the waveguides 122a through 122n may be from about 1.4 to about 2.0, whereas the refraction index of the gap layer 130 may be from about 1.0 to about 2.0.

If a point on the touch substrate 110 is pressed by a finger, for example, the touch substrate 110 and the waveguide layer 120 are bent by the pressure, and the thickness of the portion of the gap layer 130 corresponding to the point pressed by the finger decreases. If a distance between the waveguide layer 120 and the optical output structure 140 decreases to a particular value, a part of the light propagating in the waveguides 122a through 122n may be transmitted to the optical output structure 140 according to an evanescent coupling mechanism, where the amount of light transmitted to the optical output structure 140 generally increases as the distance between the waveguide layer 120 and the optical output structure 140 decreases. To this end, the refraction index of the optical output structure 140 may be greater than the refraction indexes of the gap layer 130 and the waveguides 122a through 122n. For example, the refraction index of the optical output structure 140 may be from about 1.7 to about 2.8. Light incident to a bottom surface of the optical output structure 140 from the waveguide layer 120 in the manner described above may be emitted to the concave mirror 160 via a light exit surface 140a of the optical output structure 140. Therefore, light may be output via the optical output structure 140 only at points pressed by a finger, for example. Furthermore, if the plurality of waveguides 122a through 122n are arranged next to one another in the waveguide layer 120, a plurality of points may be pressed, such that light is output from a plurality of points.

Referring back to FIG. 1, light output by the optical output structure 140 is reflected by the concave mirror 160 and is projected to the outside. The light reflected by the concave mirror 160 may be magnified according to the curvature radius of the concave mirror 160. Furthermore, if the concave mirror 160 is employed, the shape of touches made on the touch substrate 110 may be displayed without being flipped vertically or horizontally.

Figure 4:
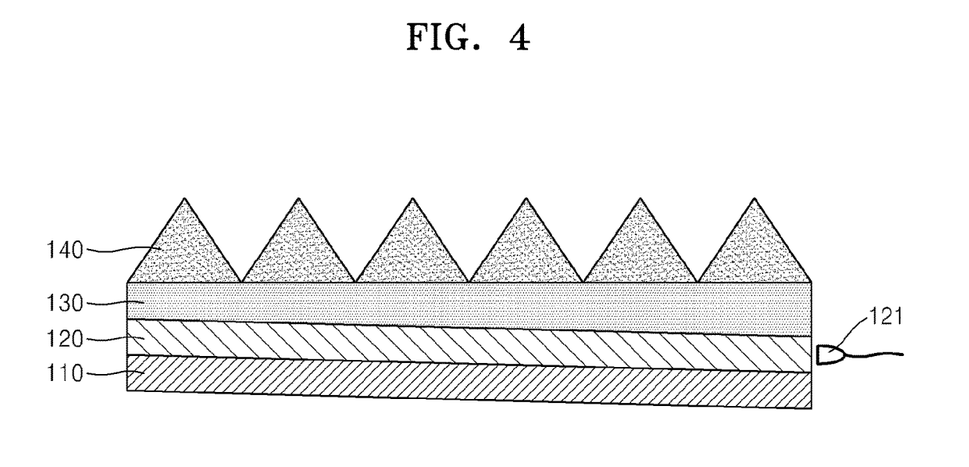
FIG. 4 is a sectional diagram showing an example configuration of a non-electric type touch panel employing the waveguide layer shown in FIG. 3.

Meanwhile, as shown in FIG. 2, if the waveguide layer 120 includes a plurality of waveguides 122a through 122n having the same length, when a plurality of touches are simultaneously made to one of the waveguides 122a through 122n, a relatively large amount of light may be output from touched locations close to an optical input, whereas a relatively small amount of light may be output from touched locations farther from the optical input. Therefore, in order to ensure a uniform output of light from a plurality of touched locations of a single waveguide, the thickness of the gap layer 130 may gradually decrease from the optical input ends of the waveguides 122a through 122n to the opposite ends of the waveguides 122a through 122n as shown in FIG. 4. In this case, even if a plurality of touches are made to one of the plurality of waveguides 122a through 122n, the distances between the waveguide layer 120 and the optical output structure 140 are relatively large at touched locations closer to optical inputs of the waveguides 122a through 122n, and the distances between the waveguide layer 120 and the optical output structure 140 are relatively smaller at touched locations farther from optical inputs of the waveguides 122a through 122n. As a result, a uniform amount of light may be output from the plurality of touched locations.

Furthermore, instead of changing the thickness of the gap layer 130 according to locations, the hardness of the gap layer 130 may be changed according to locations. For example, the hardness of the gap layer 130 may gradually decrease from optical input ends of the waveguides 122a through 122n to the opposite ends of the waveguides 122a through 122n. In this case, the hardness of the gap layer 130 is relatively large at touched locations closer to optical inputs of the waveguides 122a through 122n, and thus changes of the thickness of the gap layer 130 are relatively small. On the contrary, the hardness of the gap layer 130 is relatively smaller at touched locations farther from optical inputs of the waveguides 122a through 122n, and thus changes of the thickness of the gap layer 130 are relatively large. As a result, a uniform amount of light may be output from a plurality of touched locations.

Figure 5:
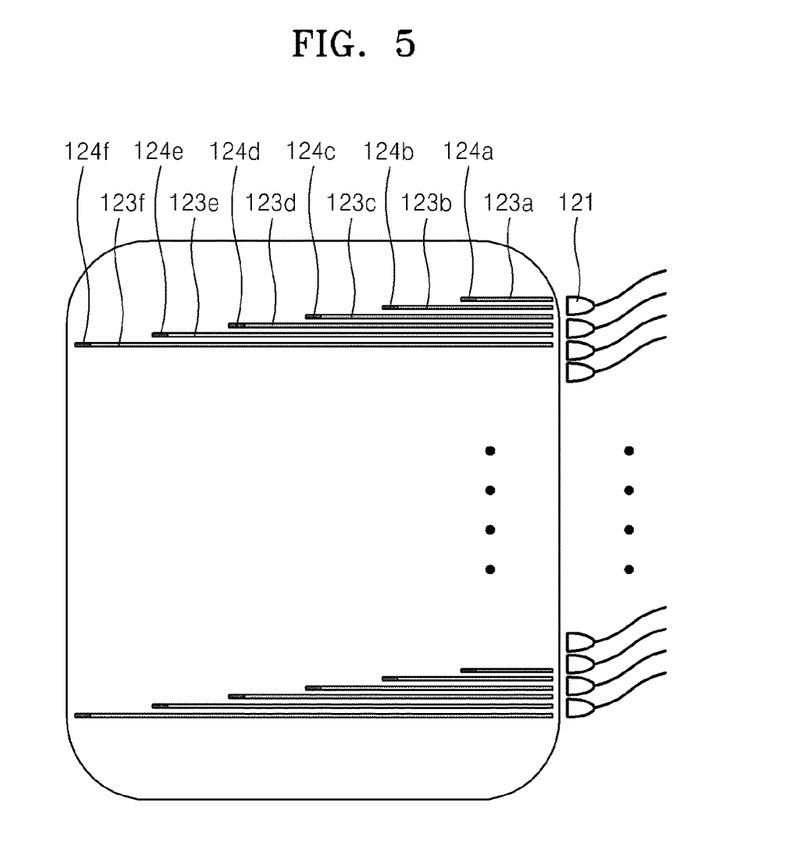
FIG. 5 is a schematic plan view of an example configuration of a waveguide layer of the non-electric type touch panel, according to another exemplary embodiment.

Furthermore, as shown in FIG. 5, a plurality of waveguides, which have different lengths and are parallel to one another, may be used. Referring to FIG. 5, the waveguide layer 120 may include a plurality of first waveguides 123a through 123f, which have different lengths and are parallel to one another, and a plurality of second waveguides 124a through 124f, which are respectively arranged at ends of the first waveguides 123a through 123f. Here, the first waveguides 123a through 123f may be formed of a hard material and may be barely bent by external pressure, whereas the second waveguides 124a through 124f may be formed of elastically deformable materials. In this case, no light may be output when touches are made to the first waveguides 123a through 123f, and light may be output only when touches are made to the second waveguides 124a through 124f. Furthermore, as shown in FIG. 5, the plurality of first waveguides 123a through 123f having different lengths may constitute a single pixel line, and a plurality of pixel lines may be repeatedly arranged on the waveguide layer 120. Therefore, if a plurality of touches are made to a single pixel line, light is output via the plurality of second waveguides 124a through 124f, according to touched locations, and thus a uniform amount of light may be output via the plurality of touched locations.

Figure 6:
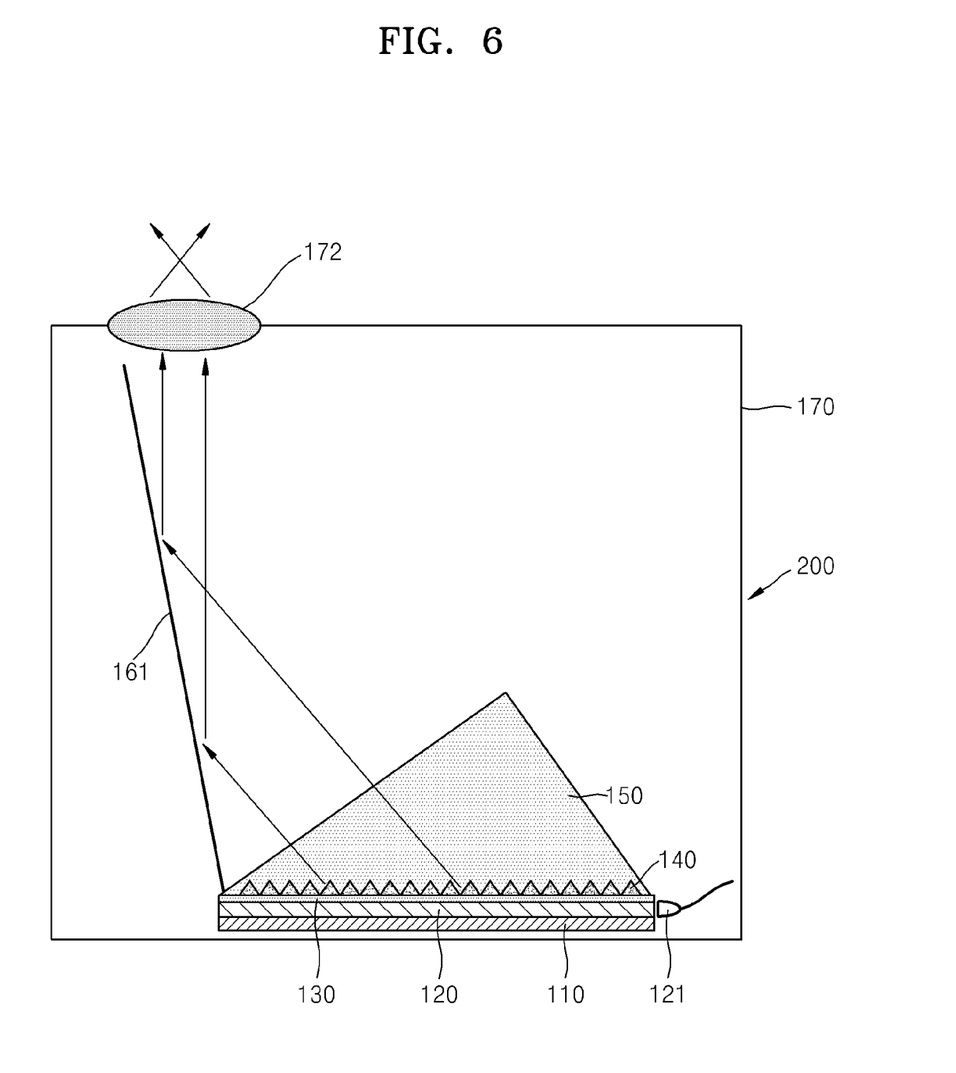
FIG. 6 is a schematic view of an optical apparatus including a non-electric type touch panel, according to another exemplary embodiment.

FIG. 6 is a schematic view of an optical apparatus 200 including a non-electric type touch panel, according to another exemplary embodiment. The optical apparatus 200 shown in FIG. 6 is identical to the optical apparatus 100 shown in FIG. 1, except that the optical apparatus 200 includes a flat mirror 161 and an optical lens 172 as an optical system projecting light output by the optical output structure 140 to the outside. For example, the flat mirror 161 may reflect light output by the optical output structure 140 to the optical lens 172. The optical lens 172 may be fixed to the housing 170 and may have a positive refractive power for focusing light reflected by the flat mirror 161. Although FIG. 6 shows that the optical lens 172 includes only one convex lens for convenience of explanation, the optical lens 172 may include a plurality of lenses for aberration compensation and a zooming function.

Figure 7:
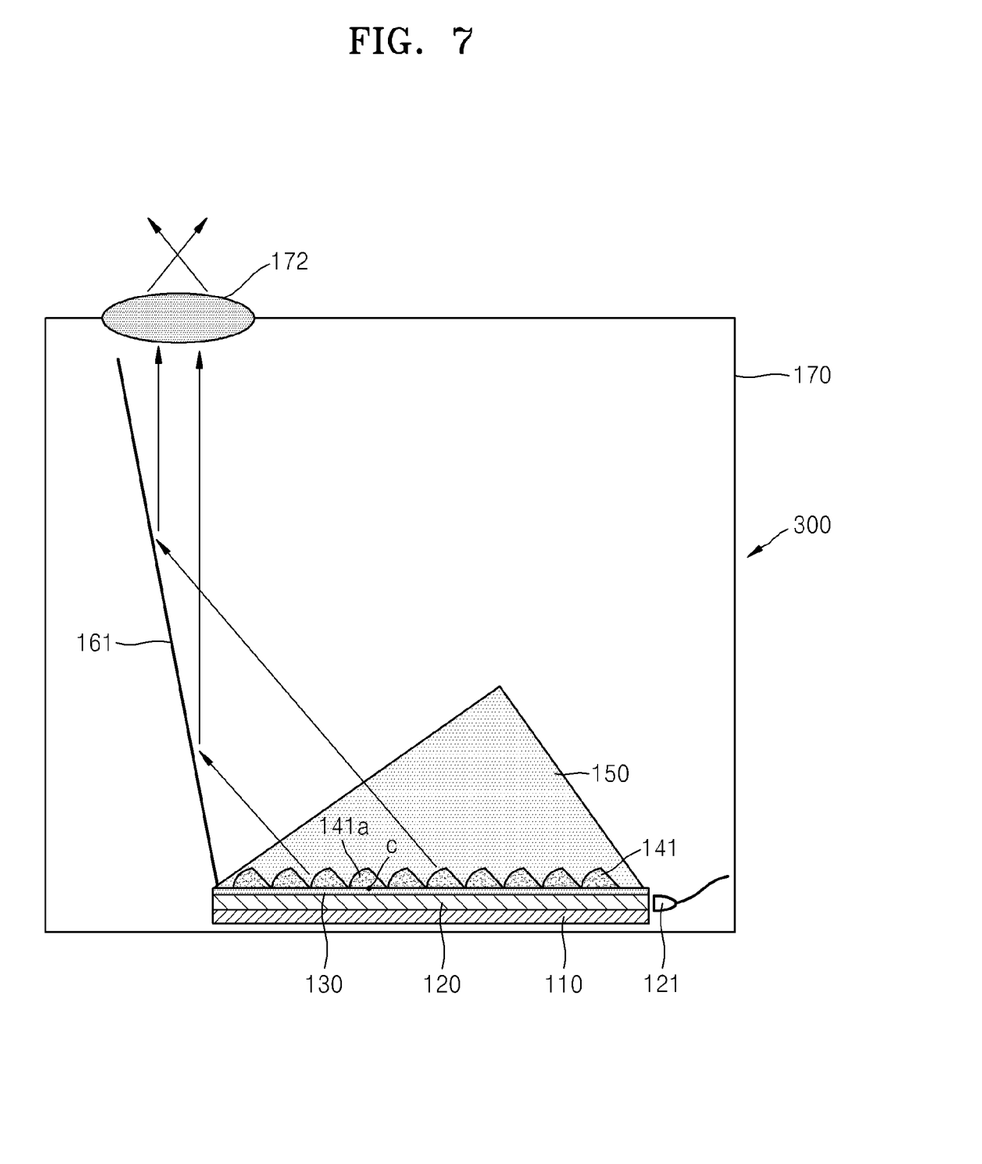
FIG. 7 is a schematic view of an optical apparatus including a non-electric type touch panel, according to another exemplary embodiment.

FIG. 7 is a schematic view of an optical apparatus 300 including a non-electric type touch panel, according to another exemplary embodiment. The optical output structure 140 of the optical apparatus 200 according to the embodiment shown in FIG. 6 includes micro-prisms having flat light exit surfaces, whereas an optical output structure 141 of the optical apparatus 300 shown in FIG. 7 may include micro-prisms having curved light exit surfaces 141a. The structure of the optical apparatus 300 according to the present embodiment, except for the micro-prisms, may be identical to that of the optical apparatus 200 shown in FIG. 6. For example, shape of a light exit surface 141a of each of micro-prisms may be a circular arc of which the origin is the center c of the bottom surface of the corresponding micro-prism via which light is incident. In this case, light incident via the center c of the bottom surface of the micro-prism from the waveguide layer 120 will hardly be refracted at the light exit surface 141a when the light is emitted from the light exit surface 141a. Therefore, deviations in a direction in which light is output due to refraction at the light exit surface 141a of the micro-prism may be reduced. Although FIG. 7 shows that the optical apparatus 300 includes the flat mirror 161 and the optical lens 172, the optical apparatus 300 may include the concave mirror 160 like in the embodiment shown in FIG. 1.

Figure 8:
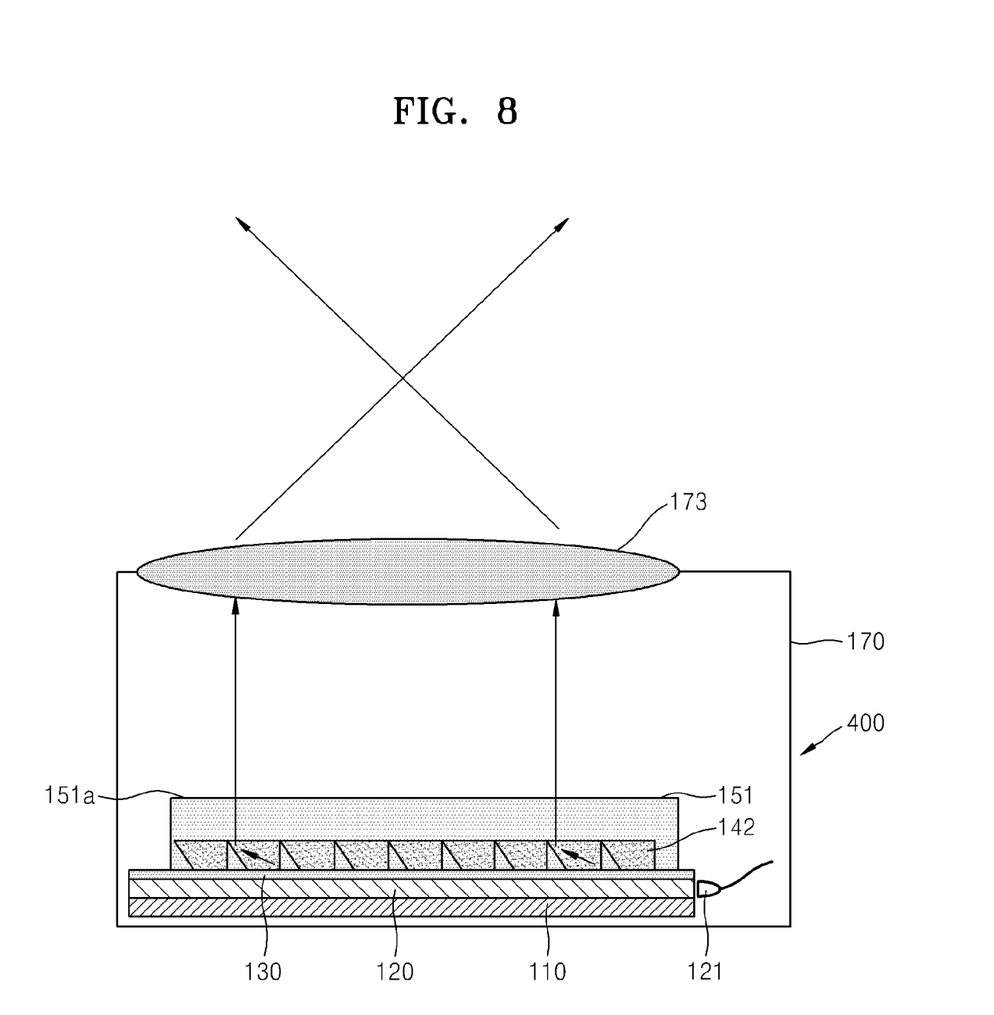
FIG. 8 is a schematic view of an optical apparatus including a non-electric type touch panel, according to another exemplary embodiment.

FIG. 8 is a schematic view of an optical apparatus 400 including a non-electric type touch panel, according to another exemplary embodiment. Referring to FIG. 8, an optical output structure 142 of the optical apparatus 400 may include a reverse trapezoidal micro-prism array in which a plurality of reversed trapezoidal micro-prisms are repeatedly arranged. For example, as shown in FIG. 8, the light incident surface and the light exit surface of each of the reversed trapezoidal micro-prisms may be parallel to each other, and the width of the light exit surface may be greater than the width of the light incident surface. Furthermore, one of side surfaces between the light incident surface and the light exit surface may be a vertical flat surface, substantially perpendicular to the output surface of the gap layer, and the other may be an inclined flat surface, inclined with respect to the output surface of the gap layer. In this case, light incident on the light incident surface may be reflected by the inclined flat surface and may be emitted from the light exit surface.

In the embodiments described above, light is emitted in angled directions via the optical output structures 140 and 141. Therefore, to change the direction in which light propagates, to have the light propagate parallel to the optical axis, the concave or flat mirror 160 or 161 may be employed. However, in the embodiment shown in FIG. 8, light output by the optical output structure 142 propagates in parallel to the optical axis, and thus no mirror is necessary. In other words, the optical apparatus 400 may include only an optical lens 173 having a positive refraction power as an optical system for projecting output light to the outside without the use of a mirror. As shown in FIG. 8, the optical lens 173 may be arranged to face the optical output structure 142.

Furthermore, the optical apparatus 400 according to the present embodiment may further include a transparent fixing member 151, which is arranged on the gap layer 130 and over the optical output structure 142 to fix the optical output structure 142 including the reversed trapezoidal micro-prism array. As shown in FIG. 8, the fixing member 151 may have a light exit surface 151a, which is parallel to the light exit surface of the reversed trapezoidal micro-prism array. For example, the fixing member 151 may be a cuboid flat-parallel plate.

Figure 9:
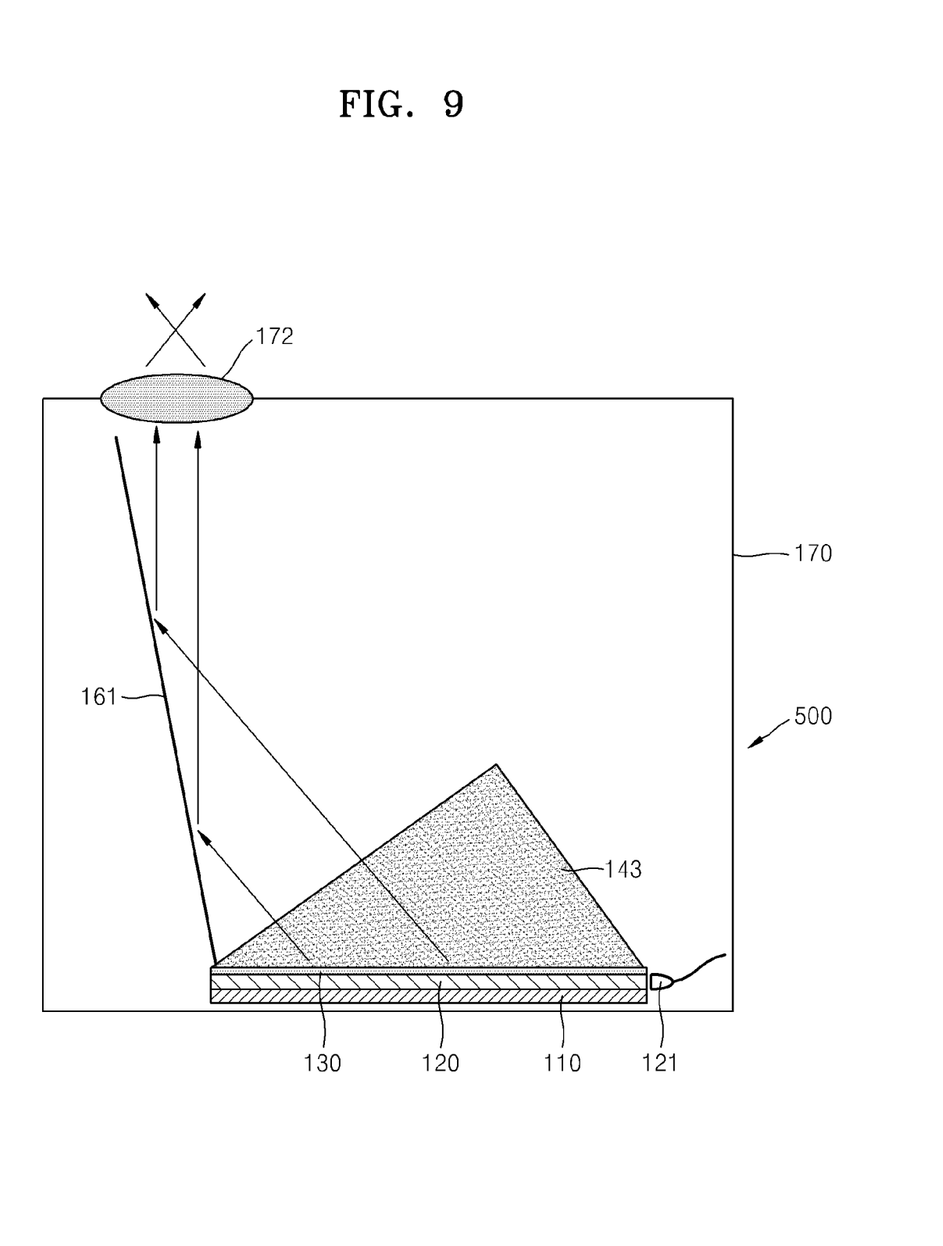
FIG. 9 is a schematic view of an optical apparatus including a non-electric type touch panel, according to another exemplary embodiment.

FIG. 9 is a schematic view of an optical apparatus 500 including a non-electric type touch panel, according to another exemplary embodiment. As shown in FIG. 9, an optical output structure 143 of the optical apparatus 500 may include only one prism arranged on the gap layer 130. Furthermore, although FIG. 9 shows that the optical apparatus 500 includes the flat mirror 161 and the optical lens 172 as the optical system, the optical apparatus 500 may include only the single concave mirror 160.

The optical apparatus 100, 200, 300, 400, or 500 may illuminate particular points on a large presentation screen image for education or presentation. Therefore, various motions that cannot be displayed using a laser pointer that is capable of only illuminating a single point at a time in the related art may be provided. For example, a plurality of points may be simultaneously illuminated by touching a plurality of locations on the touch substrate 110, and lines and surfaces may also be illuminated. Furthermore, since the optical apparatus 100, 200, 300, 400, or 500 operates non-electrically, the optical apparatus 100, 200, 300, 400, or 500 may be used even where it is difficult to use electricity. The optical apparatus 100, 200, 300, 400, or 500 may also be applied not only to presentations, but also to billboards. For example, light having various different shapes, such as characters, images, and numbers, may be projected by simultaneously touching a plurality of locations on the touch substrate 110.

Figure 10A:
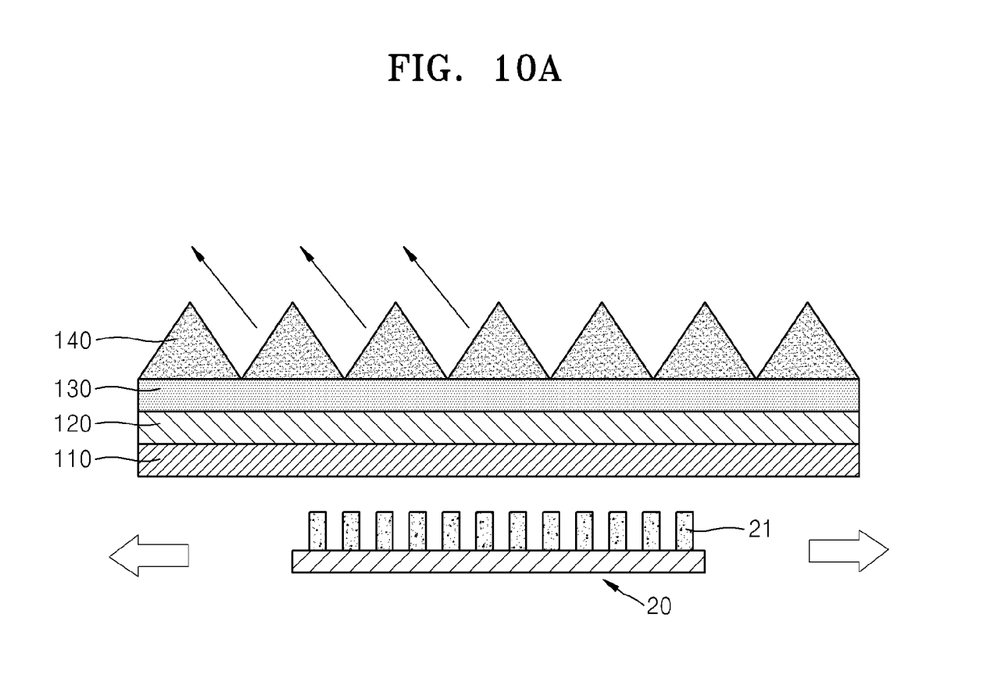
FIGS. 10A and 10B are diagrams schematically showing examples of applications of the non-electric type touch panel of the above-stated optical apparatus projecting lights in arbitrary shapes.
Figure 10B:
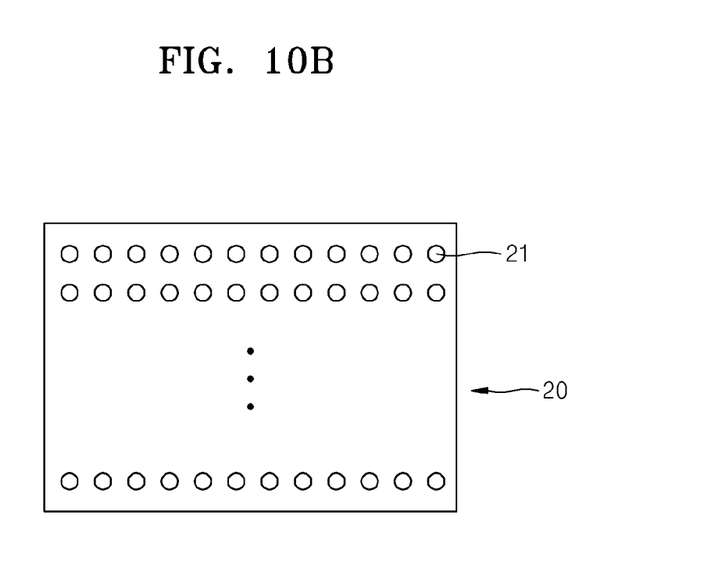

FIGS. 10A and 10B are diagrams schematically showing examples of applications of the non-electric type touch panel of the optical apparatus 100, 200, 300, 400, or 500 projecting lights in various shapes. FIG. 10A is a sectional view of a pressing element array 20, and FIG. 10B is a plan view of the pressing element array 20. Although FIG. 10A only shows the pressing device 20 and the touch panel portion 110, 120, 130, and 140 of the optical apparatuses 100 and 200 for convenience, the pressing element array 20 may also be applied to the other optical apparatuses 300, 400, and 500.

Referring to FIGS. 10A and 10B, the optical apparatus 100, 200, 300, 400, or 500 may include a pressing element array 20 configured to press the touch substrate 110 in a predetermined pattern. For example, the pressing element array 20 may include a plurality of 2-dimensionally arranged pressing elements 21. The plurality of pressing elements 21 may be actuators independently operating according to electric control. For example, the pressing elements 210 may be piezoelectric pressing devices. As the pressing elements 210 press the touch substrate 110 according to electric control, the optical apparatus 100, 200, 300, 400, or 500 may project light in a predetermined pattern. Furthermore, the pressing element array 200 may be arranged to be able to move with respect to the optical apparatus 100, such that projected light may be moved.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An optical apparatus comprising:
a touch substrate;
a waveguide layer, disposed on the touch substrate, the waveguide layer comprising a plurality of waveguides;
an optical output structure, which is disposed on the waveguide layer and is configured to output light propagating in the plurality of waveguides at touched locations of the touch substrate;
a gap layer disposed between the waveguide layer and the optical output structure and providing a gap between the waveguide layer and the optical output structure;
an optical system, which projects light output by the optical output structure; and
a transparent fixing member disposed on the gap layer such that the transparent fixing member covers the optical output structure,
wherein the optical output structure comprises an array of reversed trapezoidal micro-prisms, and
wherein the array of reversed trapezoidal micro-prisms are disposed between the gap layer and a light exit surface of the transparent fixing member.

2. The optical apparatus of claim 1, wherein the optical system is substantially parallel to the optical output structure and comprises an optical lens having positive refractive power.

3. The optical apparatus of claim 1,
wherein the light exit surface of the transparent fixing member is parallel to a light exit surface of each of the reversed trapezoidal micro-prisms.

4. The optical apparatus of claim 1, wherein each of the reversed trapezoidal micro-prisms comprises a light incident surface, a light exit surface parallel to the light incident surface, a first side surface between the light incident surface and the light exit surface, and a second side surface between the light incident surface and the light exit surface,
  wherein the first side surface is a vertical flat surface substantially perpendicular to the light incident surface, and the second side surface is an inclined flat surface which is inclined with respect to the light incident surface.

\* \* \* \* \*